United States Patent [19]

Paptzun et al.

[11] 4,057,883
[45] Nov. 15, 1977

[54] METHOD OF ASSEMBLING ROTARY BALL VALVE

[75] Inventors: George J. Paptzun; Anthony B. Monnig, both of Cincinnati, Ohio

[73] Assignee: The Lunkenheimer Company, Cincinnati, Ohio

[21] Appl. No.: 652,173

[22] Filed: Jan. 26, 1976

Related U.S. Application Data

[62] Division of Ser. No. 416,051, Nov. 15, 1973, Pat. No. 3,948,480.

[51] Int. Cl.² .......................... B23P 15/00; F16K 5/14
[52] U.S. Cl. .................................. 29/157.1 R; 29/445; 277/170
[58] Field of Search ............... 29/157.1 R, 156.7 A, 29/445, 523; 251/315, 316, 365; 137/454.2; 277/170, 168, 169, 171, 172

[56] References Cited

U.S. PATENT DOCUMENTS

| 448,765 | 3/1891 | Kaiser | 277/170 |
| 1,839,248 | 1/1932 | Morley et al. | 277/168 |
| 2,839,266 | 6/1958 | Kaiser | 251/315 |
| 3,047,007 | 7/1962 | Lunken | 29/157.1 R |
| 3,214,181 | 10/1965 | Rood | 277/170 |
| 3,228,652 | 1/1966 | Antrim | 251/315 |
| 3,239,191 | 3/1966 | Widera | 251/315 |
| 3,288,430 | 11/1966 | Priese | 251/315 |
| 3,348,805 | 10/1967 | Sanctuary | 251/315 |
| 3,384,341 | 5/1968 | Ripert | 251/315 |
| 3,717,323 | 2/1973 | Geipel | 251/315 |

Primary Examiner—C.W. Lanham
Assistant Examiner—Daniel C. Crane
Attorney, Agent, or Firm—Wood, Herron & Evans

[57] ABSTRACT

A rotary ball valve includes a seat support integral with the valve body, a rotatable ball, a movable seat support, a retaining ring, and, on opposite sides of the ball, thin annular seating rings made from a material, such as tetrafluoroethylene. When the valve is assembled, the seating rings are deformed to engage the ball and supports and undergo a small amount of cold-flow outwardly toward interior passage walls of the valve body so that the outer periphery of the seat rings engages and forms a seal between the ball member and the interior passage wall. The seat-engaging surfaces of the seat supports each have grooves into which the seating rings cold-flow during valve assembly. Ribs are thus formed on the seating rings which keep the seats from rocking. The valve also provides an improved stem seal, including a Belleville washer confining a tetrafluoroethylene washer. In addition, the valve includes a handle having a novel projection for limiting movement of the ball to 90° and for aligning the ball in its fully opened and fully closed positions.

22 Claims, 8 Drawing Figures

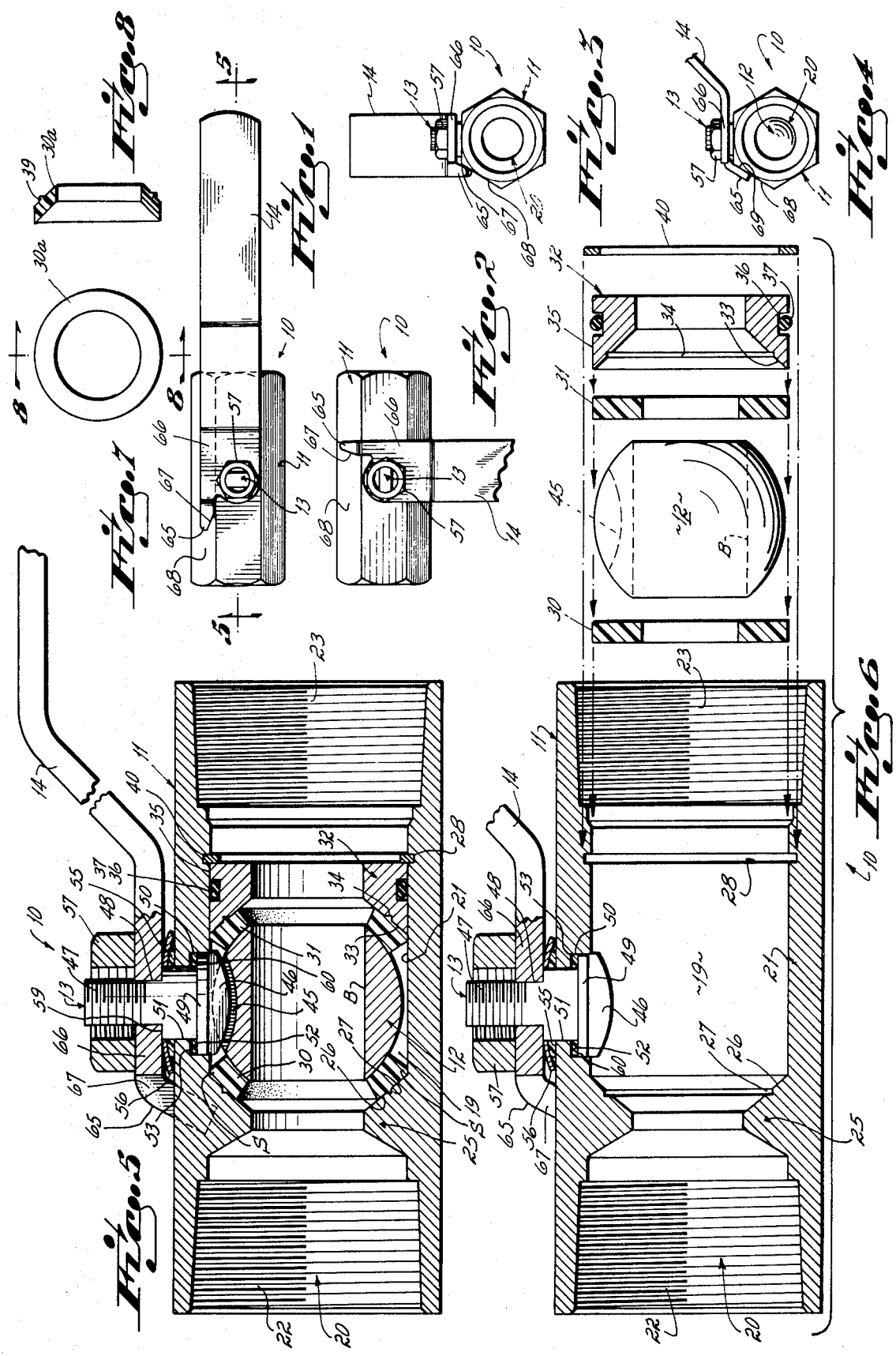

METHOD OF ASSEMBLING ROTARY BALL VALVE

This is a division, of application Ser. No. 416,051, filed Nov. 15, 1973, now U.S. Pat. No. 3,948,480.

This invention relates to rotary ball valves and primarily to improved sealing apparatus for rotary ball valves.

Such valves have been adapted to many applications, but the present invention renders them particularly useful in those applications demanding a relatively low cost valve and a relatively high degree of sealing quality. Accordingly, it has been a primary object of the invention to provide a rotary ball valve made from a minimum number of parts which are quickly and easily assembled. Moreover, despite the fact that the parts are not manufactured to exacting tolerances, the present valve provides a very reliable seal between the ball and the valve body, which seal will remain tight even after a long operational life.

A more specific objective of the invention has been to provide a ball valve which is sealed by two plastic seating rings which are deformed incident to assembly of the valve in a manner which utilizes the physical characteristics of the seating rings to enhance and perfect the seal and to eliminate leakage due to undesired movement of the seats.

Rotary ball valves of the type to which the invention has been directed normally include an elongated body having a passageway therethrough and a rotatable ball member within the passageway for closing or opening the passageway via rotation of the ball to align a bore in the ball with the passageway. In such valves it has been the practice to provide compressible annular sealing components or seating rings between the ball member and the interior walls of the passageway to seal the valve against leakage around the ball. These seating rings are conventionally members of substantial cross-section which are molded to their final seating configuration prior to assembly of the valve. These valves also normally require a seat retainer assembly of one type or another to maintain the seats in their proper position.

For example, in U.S. Pat. No. 3,717,323, molded annular seating rings are maintained in position on each side of a ball member via ferrules which are screwed against the seats within the interior passage of the valve body. One disadvantage of such a seal is that it requires that the ball and seats be manufactured to close tolerances. Other examples of prior art valves using preformed molded seating rings are U.S. Pat. Nos. 3,522,930 and 3,554,485. One defect of valves of this type is that they require a large number of parts to serve as retaining and backing elements for the seating rings.

In most cases, it has been found desirable to form the seating rings from a tetrafluoroethylene, such as Teflon. This material has many desirable characteristics for this purpose, such as its chemical inertness, resistance to corrosion, a low frictional coefficient, and the like. However, the material also has one characteristic which, in the past, has caused considerable difficulty in the provision of reliable seals. This characteristic is a tendency to "cold-flow", i.e., to undergo a deformation when placed under pressure such that the material will not return to its original shape and dimensions.

In the past, various approaches have been taken to minimize the effects of cold-flow. For example, as shown in U.S. Pat. Nos. 3,522,930 and 3,554,485, it has been proposed to provide resilient or other special types of backing members for the Teflon seating rings. Even with the use of these members, however, it has not been possible to obtain totally reliable seats, while the overall cost of the valve has been increased appreciably.

Accordingly, one of the principal objects of the present invention is to provide a valve construction which utilizes seating rings formed of a material, such as tetrafluoroethylene, but which substantially eliminates problems caused by cold-flow. More particularly, the present invention is predicated in part on the concept of providing a valve including seating rings of very thin cross-section which minimizes cold-flow after assembly. The seating rings are compressed and deformed during assembly of the valve so that they engage both the ball and rigid support surfaces. The support surfaces, ball and valve body are configurated so that a space is provided outwardly of the rings into which the rings may cold-flow. Cold-flow in this radial outward direction increases the seal of the ring against the housing and augments the fluid tightness of the valve.

In accordance with the present invention, cold-flow is minimized through the interplay of several aspects of the seat configuration. In the first place, the present seat facilitates the use of a relatively large seat bearing area. Consequently, the unit area bearing stress on the seat rings is materially reduced with a concomitant reduction in cold-flow. While at first blush the employment of relatively low bearing stress would appear to give rise to sealing problems, such problems are eliminated in the present seat by the employment of a particular seat width-to-thickness ratio.

More particularly, the present seat is designed to function as a gasket with the seal provided over a large contact area as opposed to a seal effected by substantially linear, high pressure contact as heretofore employed in most ball valve seats. In accordance with the present invention, the seat width-to-thickness ratio is in the range of from substantially 2 to 4. By maintaining the seat dimensions within this ratio, an effective seal is obtained utilizing relatively low sealing stresses. If the ratio is below two, the required sealing stress rises very rapidly. Thus, if a valve should not provide the required high sealing stress, leakage would occur. On the other hand, when this high sealing stress is provided, the sealing rings are subject to substantial cold-flow. If the seats are shaped so that their width-to-thickness ratio is raised above four, there is a slight drop in the required sealing stress. However, there is not a significant improvement in sealing performance commensurate with the cost of providing the increased ratio.

In addition to the small stresses present, the physical thinness of the present seat is another factor which minimizes the effect of cold-flow. More particularly, cold-flow is a function of section thickness. Thus, for example, a ⅜ inch thick seat material which has a 1% cold-flow will have a total movement of 0.00375 inches. In contrast, the present seats which have a thickness preferably of ⅛ inch or less, if made of the same material, will move only 0.00125 inches or less. This represents at least a 67% reduction in movement due to cold-flow.

A further object of the present invention has been to improve the efficiency of the seal by eliminating the rocking movement of the seal during cycling of the valve. More particularly, in many seats of the prior art there is a tendency of the seat to rock during opening and closing of the valve, permitting fluid leakage around the valve ball. In accordance with the present invention, this rocking action is eliminated by means of a rib formed on the seat as the seat is distorted and cold-flows incident to the assembly of the valve. More particularly, in the present valve the rear face of each seal engages a sloping support surface. Each support surface includes a circular groove. When the seat is compressed during assembly, the seat material cold-flows into these grooves forming ribs which interlock with the grooves to prevent rocking motion of the seat. Alternately, the ribs can be preformed on conical seats and pressed into the grooves upon assembly.

A further object of the present invention is the provision of improved sealing components for the ball actuator which rotates the ball between its open and closed positions. A conventional actuator includes a stem extending through a bore in the valve body and having an end shaped to engage a corresponding recess in the ball. A plurality of glands, washers and the like are normally used to seal the shaft and its bore against leakage and it has been generally necessary to machine grooves in the valve bodies to inhibit excessive, radially outward cold-flow of these components. Examples of such seals can be seen in the aforementioned patents.

Applicants have found that improved stem sealing can be effected by taking advantage of the aforementioned cold-flow characteristics of certain sealing materials while at the same time reducing the number of parts required and the number of machining operations on the valve body. It has thus been a specific objective of the invention to provide an improved stem seal for a ball actuator of a rotary ball valve while at the same time reducing the machining operations required for the valve body.

In use, the ball valves are particularly well adapted for two-position applications, i.e., for regulating fluid flow in either a fully open or fully closed condition. Movement between these two positions requires ball rotation through 90° so as to align or to render transverse the ball's bore with respect to the passageway in the valve body. In order to correctly position the ball in either of these two positions, it is desired to provide positive stops for each position.

It is a further objective of the invention to provide a rotary ball valve having a novel and economical stop means for insuring that the ball is accurately located in its "open" and "closed" positions. To these ends, a preferred embodiment of the invention includes an elongated valve body formed of polygonal bar stock having a single integral seat retainer within a passageway through the body. Two annular seats bear against opposite sides of a ball member in the passageway, and provide a seal between the ball and body. The valve body includes an integral seat support which engages one of the seats and a movable seat support which engages the second seat on the opposite side of the ball. A snap-type retainer ring abuts the outer surface of the movable seat support. The ring partially fits into a recess machined on the interior of the valve body. The retainer is effective to hold both annular seats, the ball and the movable seat support in assembled relationship within the valve body.

When the valve is assembled, a first annular seating ring preferably in the form of a flat washer-like disc is inserted into the valve body, followed by the ball member, a second identical seating ring, the movable seat support and a seat retaining ring. A mandrel is inserted into the valve body and presses the assembly together against the integral support surface until the retainer ring is captured in a groove within the passageway of the valve body. During this assembly operation, the seat rings are partially compressed and are deformed into mating engagement with the ball and seat supports. The seat ring material undergoes a relatively small amount of cold-flow outwardly toward the interior passage walls of the valve body so that the outer periphery of the seat engages and forms a seal between the ball member and the interior passage wall. The seat ring material also flows into the grooves in the seat retainers to form ribs which prevent the seat from rocking. Thus, the limited cold-flow exhibited by the seat rings is utilized to enhance and perfect a seal between the ball member, the seat supports, and the interior passage wall of the body; and is also utilized to form a rib on the outer surface of the seat which maintains the seat against rocking during the cycling of the valve.

In the preferred embodiment, a seal is also provided between the stem and valve body. This seal includes a sealing washer made from a tetrafluoroethylene material inserted over the stem against an exterior portion of the valve body. A Belleville washer is placed over the sealing washer so that its concave side engages the sealing washer and its peripheral edge engages the valve body to confine the sealing washer. A valve handle is then placed over the Belleville washer and a nut is threaded onto the stem to compress the handle against the Belleville washer, and the Belleville washer in turn against the sealing washer and the valve body. The sealing washer tends to cold-flow between the Belleville washer and the valve body and, being confined by the Belleville washer, exerts inward radial pressure upon the valve actuating stem. Since the Belleville washer confines the sealing washer, it is unnecessary to machine grooves in the valve body to restrict excessive, radially outward cold-flow of the sealing washer.

In accordance with the present invention, the valve further includes a stop for limiting movement of the ball to 90° and for aligning the ball in its fully opened and fully closed positions relative to the fluid passageway within the valve body. The stop comprises a projection formed on the valve handle and turned downwardly and generally toward the body of the valve. In the "open" position, the valve handle is normally aligned with the elongated valve body and a side portion of the handle projection engages the surface of the valve body. With the handle so positioned, the bore of the ball is aligned with the fluid passageway in the body. In the "closed" position, the handle is positioned transversely with respect to the elongated valve body and an underneath surface of the handle projection engages the valve body to restrict further rotation of the ball member. With the handle projection abutting the valve body in this manner, the bore in the ball is disposed transversely of the valve fluid passageway and the valve is sealed against through flow.

One advantage of a rotary ball valve embodying the present invention is that it can be made on a very economical basis and yet provides a high efficiency seal. Such valves can be made from a minimal number of readily fabricated parts, and can be assembled in a rapid and economical manner. Despite this, the fluid tightness of the seal is not adversely affected by the appreciable tolerances provided.

DESCRIPTION OF THE DRAWINGS

These and other objects and advantages of the present invention will become readily apparent from the following detailed description of a preferred embodiment and from the drawings in which:

FIG. 1 shows a rotary ball valve embodying the invention in a valve open condition;

FIG. 2 shows the valve of FIG. 1 in a valve closed position;

FIG. 3 is an end view of the valve shown in FIG. 1;

FIG. 4 is an end view of the valve shown in FIG. 2;

FIG. 5 is a cross-sectional view of the interior of a rotary ball valve taken along the line 5—5 of FIG. 1;

FIG. 6 is an exploded view of FIG. 5 showing the valve parts just prior to assembly; and FIG. 7 is an elevational view of a modified seat ring; and FIG. 8 is a cross-sectional view along line 8—8 of FIG. 7.

DESCRIPTION OF A PREFERRED EMBODIMENT

Referring to the drawings, and particularly to FIG. 5, a rotary ball valve 10 includes an elongated hexagonal valve body 11, a valve closure or fluid control device comprising a rotatable ball member 12 having a bore B therethrough, an actuator stem 13 and an elongated handle 14. The elongated valve body 11 is economically formed from a suitable material, such as hexagonal brass stock, and includes a fluid passageway 20 extending therethrough. The passageway 20 includes a ball-receiving chamber 19 defined in part by an interior passageway wall 21. Each end of the passageway 20 is provided with internal threads 22 and 23, or other suitable coupling means, for joining the valve 10 within a fluid line (not shown).

The elongated valve body further includes one integral seat supporting flange 25 which extends into the passageway 20 in a radial fashion so as to provide a circumferential seat supporting surface 26. This surface is in the form of a truncated cone having a base diameter equal to the diameter of fluid passageway 20 and tapering to a smaller diameter substantially equal to the diameter of the bore B in ball 12. The seal supporting surface 26 is provided with a circular groove 27 which extends around the retaining surface and will hereinafter be referred to as an annular groove. Additionally, body 11 includes an annular retaining groove 28 spaced from the integral seat support 25 within the passageway adjacent to the opposite end of ball-receiving chamber 19.

As shown in FIG. 5 and in exploded form in FIG. 6, the valve includes annular seat rings 30 and 31 disposed on opposite sides of the ball 12. Each seat ring is made from any suitable material, but preferably from a filled or plain fluorocarbon resin, such as tetrafluoroethylene sold by DuPont Company under the trademark "Teflon." A 15% glass-reinforced Teflon type material has been found to be particularly suitable. The seats of the preferred embodiment are initially in the form of flat annular discs having a preselected uniform thickness of from approximately 0.09 to 0.13 inches, although it is contemplated that slightly thinner or thicker members can be utilized. Alternately, the seats can be preshaped to approximately their final configuration as shown in FIGS. 7 and 8. As there shown, one of the seats 30a is of substantially uniform thickness like seat 30, but is shaped so that the walls are angulated relative to the plane of the center opening at approximately the same angle as surface 26, and may incorporate preformed ribs 39 to interlock with groove 27.

In addition to ball member 12 and seat rings 30 and 31, the valve further includes a movable seat support 32. This retainer has a truncated conical seat-engaging surface designated at 33 which is of the same configuration as surface 26. Surface 33 is provided with a groove 34 similar to the circumferential groove 27. The movable seat support 32 has a generally cylindrical outer peripheral surface 35 adapted to engage, in assembled position, the interior passageway wall 21. While not required, in the preferred embodiment the movable seat support 32 is provided with a circumferential groove 36 which carries an O-ring 37 therein for sealing purposes with the interior passageway wall 21.

A retaining ring 40 is provided for securing the ball member 12, the seals 30 and 31 and the movable seat support 32 in assembled relationship. The retaining ring 40 is adapted to fit within the retaining groove 28 and is preferably a split snap ring which can be easily introduced into the passageway 20 and seated within the retaining groove 28 by conventional production equipment.

The dimensions of the seat rings 30 and 31, the ball member 12 and the movable seat support 32 are all selected so that they will not fit without compressing seat rings 30 and 31 between the ball and integral seat support 25 and the ball and movable support 32, respectively. Prior to assembly, the parts are arranged as shown in FIG. 6 and are inserted into the valve body. A press is utilized to squeeze the parts together against the integral seat support 25, until the retaining ring 40 snaps into retaining groove 28.

In the assembly of a preferred embodiment of the invention wherein 15% glass-reinforced Teflon is used as a seat material, the seats are generally designed to accommodate an average compression of 20% of the original seat thickness. That is, the originally flat rings are deformed and are compressed to an average thickness of about 80% of their original thickness. This exact degree of compression is not highly critical, however, and it has been found that seats can be fabricated which function well when compressed to a substantially higher degree, depending, of course, on the particular seat material utilized. For example, seats molded from plain Teflon have been found to work well with an assembly compression effective to reduce the thickness of the seat up to 38%. The preferred 20% squeeze, however, of the 15% glass-reinforced Teflon seats has been found to give a consistently tight seat, can be obtained easily with readily available production equipment, and causes no harmful distortion to the contiguous parts of the valve.

The valve body 11, ball member 12 and movable seat support 32 are constructed from brass or other suitable rigid materials. These members are thus not deformed to any appreciable extend during assembly of the valve. When the valve is assembled, however, seat rings 30 and 31 are deformed from their planar configuration to a cup-like configuration in which they conform to the ball and to the seat-supporting surfaces 26 and 33, respectively.

Because of the relatively thin sections of the seat rings, the rings undergo only a limited amount of compression and cold-flow. This is best shown in FIG. 5 in which the thickness of the seats is slightly exaggerated for the purpose of clarity. The relationship between the ball and seat-engaging surfaces of the supports 25 and 32 has been maintained in this view, however. It can be seen from FIG. 5 that the seat rings in their final assembled position have been deformed and slightly compressed. Since the cross-sectional area of the space between the ball and seat-supporting surfaces is somewhat narrower adjacent the bore of the ball than at the outer periphery of the ball and chamber, the compressed seat has flowed so as to assume a tapered cross-section. In other words, the major portion of the flow of the seats has been radially outwardly toward wall 21. The seat rings are thus pressed into sealing engagement with passage wall 21 as indicated at S. This particularly enhances the seal at the end of the valve containing movable seat support member 32. Moreover, the tapered configuration of the seat rings is effective in preventing the rings from being blown out of the valve through the ends of fluid passageway 20.

During valve cycling and particularly during rapid cycling, it is possible for the seats 30 and 31 to slightly rock and thus allow some slight leakage through the valve. In the preferred embodiment this problem is eliminated. More particularly, as shown in FIG. 5, the seat rings cold-flow into the annular grooves 27 and 34, respectively, so that the seats fill the grooves and ring-like ribs are formed on the seats. It has been found that the interlocking action of these ribs with grooves 27 and 34 has eliminated any tendency to rock and has resulted in increased resistance to leakage during valve cycling. Thus, the shaping of the seat rings upon assembly is effective not only to form a seal between the ball member and the interior passageway wall 21, but also to provide a resistance to seat rocking within the valve body.

In order to provide a mechanism by which the ball member can be moved to close and open the valve, the ball member itself is relieved as at the cutout slot 45 and the actuator stem 13 is provided with a corresponding lug 46 received in the cutout 45. An upper portion of the actuator stem 13 is threaded as at 47 and is flattened on two sides so as to be receivable within a rectangular slot 48 within the handle 14. When the handle is turned, the stem 13 is thereby turned and lug 46 is operable to turn the ball member 12.

The stem 13 is provided with a circular flange 49 above the lug 46 and the flange is maintained within a bore 50 having an enlarged diameter. An upper portion 51 of the bore has a narrower diameter, thereby forming a shoulder 53 which maintains the stem 13 against direct withdrawal outwardly of the valve body.

A lower thrust washer 52 is captured between the stem flange 49 and shoulder 53 forming a seal between the stem, flange 49 and shoulder 53. The lower thrust washer 52 can also be formed from any suitable material, but is preferably formed from a material, such as Teflon, which is glass reinforced or filled. When the stem and handle assembly are tightened as will be described, the thrust washer 52 is subject to cold-flow to enhance the seal between the stem and the valve body.

The final seal between the stem 13 and the valve body 11 is accomplished exteriorly of the valve body. It primarily includes an upper thrust washer 55 and a confining Belleville, or concave, washer 56. The Belleville washer 56 is positioned over the stem 13 so that its concave side encloses the upper thrust washer 55 between itself and the valve body 11. Following the Belleville washer, the handle 14 is placed on the stem 13 and a nut 57 is screwed down on the stem 13 so as to compress the handle 14 against the Belleville washer.

The upper thrust washer 55 is also made from material having cold-flow characteristics and can be made, for example, from the seat material heretofore described. When the nut 57 is tightened, the Belleville washer is compressed over this upper thrust washer 55 and the washer 55 tends to cold-flow or extrude into any remaining open space between the Belleville washer, the valve body 11 and the stem 13.

Specifically, since the outer periphery of the Belleville washer engages the valve body to enclose the upper thrust washer 55, the washer 55 tends to extrude into that space beneath the Belleville washer and against the stem 13 in a sealing relationship. Of course, the upper thrust washer 55 is also thrust against the valve body 11 in sealing relationship. It will be appreciated that the cold-flow characteristic of the upper thrust washer is thus utilized to thereby effect a seal between the valve body 11 and the actuator stem 13.

In order to provide some limit on the degree to which the washer 55 can be compressed, a shoulder 59 is provided on the actuator stem. The handle 14 can be drawn up no further than this shoulder and this effectively limits the compression of the Belleville washer toward the valve body 11 by positively limiting the distance between the handle 14 and the flange 49 on the stem. This distance, the thickness of the valve body 11 between flange 49 and the outer body surface, and the thickness of washer 52 are all selected to provide effective sealing within the range of nut movement on stem 13.

It should be appreciated that the confining effect of the Belleville washer, with respect to washer 55, aids in reducing the cost of the valve. Since the washer 55 cold flows to take the shape of the Belleville washer, the need to machine a groove to retain the thrust washer 55 from excessive radial outward cold-flow is eliminated.

While the valve at FIG. 5 is shown in its open condition so that the bore B through the ball member 12 is aligned with the passageway, the ball is rotatable about a vertical axis so that the bore B is positioned transverse to the passageway 20. In this position, the valve is closed.

The handle positions shown in FIG. 1 and FIG. 2 correspond respectively to a valve "open" and valve "closed" position of the ball member 12. In FIG. 1, the handle is aligned with the elongated valve body and in FIG. 2 the handle is transverse to the valve body.

Since the valve is intended primarily for use in applications requiring either fully opened or fully closed positions, it is desirable to provide a stop in the ball actuating or rotating mechanism which correctly positions the ball in each of these two positions. To this end, the handle 14 is provided with a handle projection 65 which is turned downwardly at an angle of 60° with respect to a horizontal portion 66 of the handle. The projection 65 is located at the side of the handle 14 so that in FIG. 1 it is spaced transversely from the longitudinal axis of the valve body 11. Additionally, the projection is located beyond the connection of the handle to the stem. The projection includes an angulated side face 67 which is disposed at an angle of 30° to the axis of the handle.

In the valve "open" position shown in FIGS. 1 and 3, side face 67 of the projection 65 is is engagement with an area of hexagonal portion 68 of the valve body 11. In the valve "closed" position, as shown in FIGS. 2 and 4, an underneath portion 69 of the projection 65 has been moved so that it engages an area of the hexagonal portion 68 of the valve body but at some distance from the front area.

It can thus be readily appreciated that the invention provides a very economical ball valve made from a minimum number of parts in a minimum number of production stages. In addition, the valve is quickly and inexpensively assembled by merely pressing the seats, ball member, movable seat support, and retaining ring into position until the retaining ring snaps into place holding the valve assembled. During this process the seats are automatically shaped around the ball, against the support surfaces, and against the interior passageway wall of the valve body. The seats also flow into the circumferential grooves in the seat support surfaces to form interlocking ribs which prevent seat rocking. Further, the ball member actuator stem and the corresponding sealing components are automatically deformed upon assembly to provide improved sealing between the stem and valve body.

While a preferred embodiment has been described, these and other modifications will become readily apparent to those of ordinary skill in the art without departing from the scope of the invention. Thus, for example, it is contemplated that movable support 32 can threadably engage internal threads in valve body 11. This threaded engagement would serve to lock the movable support in place with the valve parts in assembled condition. Accordingly, the applicants desire to be bound only by the appended claims.

We claim:

1. A method of assembling a rotary ball valve having a valve body, a passageway therethrough defined by passageway walls, an integral seat support in said valve body extending into said passageway, a first flat annular seat ring made of a material susceptible to cold-flow, a ball valve member, a second flat annular seat ring made of a material susceptible to cold-flow, a movable seat support and an assembly retaining means, said seat supports each defining frustoconical seat ring support surfaces facing said ball valve member and wherein spaces between said frustonconical surfaces and said ball valve member increase in dimension from points near said passageway toward points radially outwardly thereof, the method comprising the steps of:

inserting, in order, into said passageway said first flat annular seat ring, said ball valve member, said second flat annular seat ring, said movable seat support and said assembly retaining means;

applying force to said ball valve member, seat rings, movable seat support and said assembly retaining means to urge said seat rings, said ball valve member, and said movable seat support toward said integral seat support in order to secure said assembly retaining means in said passageway and thereby hold said seat rings, said ball valve member and said movable seat support in their respective positions, and thereby deforming said flat annular seat rings to conform to the ball valve member and to the seat supports in sealing engagement therewith so that said seat rings form respective seals between said ball valve member and said supports; and the method further including the step of compressing said seat rings respectively between said ball valve member and said frustoconical surfaces, respectively, thereby deforming said seat rings from flat configuration to frustoconical configuration, tapered in cross-section in order to fill portions of said spaces in sealing engagement with said ball valve member and said frustoconical surfaces.

2. A method as in claim 1 further including the step of compressing said seat rings to force them into sealing engagement with said passageway walls.

3. A method as in claim 1 wherein said seat rings have a cross-sectional width to thickness ratio in the approximate range of 2 to 4 and further including the step of deforming said seat rings from flat to tapered configuration to form said seals.

4. A method as in claim 3 including compressing said seat rings, during assembly, to approximately 80% of their original thickness.

5. A method as in claim 4 wherein said flat annular seat rings comprise glass-reinforced tetraflouroethylene material and said method includes cold-flowing said material to form a seal against said passageway wall.

6. A method as in claim 1 wherein said valve body includes a retaining groove means for receiving said retaining means, the method including the step of compressing said ball member, seat rings and movable seat support together and toward said integral seat support and seating said retaining means in said retaining groove means.

7. A method as in claim 1 wherein the step of deforming said seat rings includes deforming them such that in cross-section that side of the seat rings engaging said ball member takes on a partial spherical, concave configuration, and that side of said seat rings opposite said ball member takes on an inclined configuration corresponding to said frustoconical seat ring support surfaces, respectively.

8. A method of assembling a rotary ball valve having a valve body, including passageway defining walls therein, a rotatable ball valve member, a seat ring on each side of said ball valve member, and seat ring supports having frustoconical seat ring support surfaces facing said ball valve member and engaging respective seat rings, said seat rings comprising flat annular discs having apertures therein and said method including the step of compressing said discs between said ball valve member and said frustoconical surfaces, respectively, and deforming each respective flat annular disc, incident to said compression, from said flat configuration into a frustoconical configuration tapered in cross-section to sealingly engage, respectively, said ball on one side of said seat ring and a respective support surface on another side of said seat ring and to sealingly engage said walls to provide a seal between said ball valve member and said walls.

9. A method as in claim 8 wherein said flat annular seat rings comprise glass-reinforced tetraflouroethylene material and said method includes cold-flowing said material to form a seal against said passageway wall.

10. A method of assembling a rotary ball valve having a valve body, a passageway therethrough defined by passageway walls, a rotatable ball valve member, seat rings, and seat ring supports having frustoconical seat ring support surfaces facing said ball valve member and intersecting said passageway walls, one of said frustoconical seat ring support surfaces movably intersecting said passageway walls, said seat rings comprising annular frustoconically shaped members having walls of uniform thickness and having apertures therein, and said method including the step of compressing said seat ring between said ball valve member and said frustoconical support surfaces, respectively, and deforming each respective seat ring incident to said compression, from said frustoconical configuration having walls of uniform thickness to a substantially frustoconical configuration seat ring having one concave wall sealingly engaging said ball, one frustoconical side sealingly engaging a respective frustoconical support surface on another side of said seat ring and one portion thereof sealingly engaging said passageway walls to form a seal between said ball valve member and said walls.

11. A method as in claim 10 wherein said seat rings comprise glass-reinforced tetraflouroethylene material and said method includes cold-flowing said material to form a seal against said passageway walls.

12. A method of assembling a rotary ball valve having a valve body, a passageway therethrough, an integral seat support in said valve body extending into said passageway and having a frustoconical seat support surface intersecting a wall of said passageway, a first flat annular seat ring made of a material susceptible to cold-flow, a ball valve member, said frustoconical seat support surface of said integral seat support facing said ball valve member, a second flat annular seat ring made of a material susceptible to cold-flow, a movable seat support having a frustoconical seat support surface facing said ball valve member and movably intersecting a wall of said passageway, and an assembly retaining means, the method comprising the steps of:

inserting, in order, into said passageway said first flat annular seat ring, said ball valve member, said second flat annular seat ring, said movable seat support and said assembly retaining means;

applying force to said ball valve member, seat rings, movable seat support and said assembly retaining means to urge said seat rings, said ball valve member, and said movable seat support toward said integral seat support in order to secure said assembly retaining means in said passageway and thereby hold said seat rings, said ball valve member and said movable seat support in their respective positions, compressing said seat rings between said ball members and said frustoconical seating surfaces, respectively, and thereby deforming said annular seat rings to conform to the ball valve member and to the seat supports in sealing engagement therewith so that said seat rings form respective seals between said ball valve member and said frustoconical support surfaces, and so that said seat rings engage walls of said passageway and form a seal between said ball valve member and the walls of said passageway.

13. A method as in claim 12 wherein said seats cold-flow to form a seal against the wall of said passageway in the valve body.

14. A method as in claim 13 wherein said frustoconical sealing surfaces on said seat supports each include a groove, and wherein the method further includes cold-flowing said seat rings into the grooves to form interlocking ribs.

15. A method as in claim 12 wherein said seat rings are compressed to a thickness of approximately 80% of their original thickness in the areas of the seats in engagement with the ball valve member.

16. A method as in claim 12 wherein said method includes applying force sufficient to deform said seat rings into frustoconical configurations about said ball valve member.

17. A method as in claim 12 wherein said seat rings have a cross-sectional width and a cross-sectional thickness less than said width, the ratio of the width to the thickness being in the approximate range of about 2 to about 4 and wherein said method includes the step of compressing said flat seat rings to about 80% of their thickness.

18. A method as in claim 17 wherein said flat annular seat rings comprise glass-reinforced tetraflouroethylene material and said method includes cold-flowing said material to form a seal against said passageway wall.

19. A method as in claim 12 wherein said valve body includes a retaining groove means for receiving said retaining means, the method including the step of compressing said ball member, seat rings and movable seat support together and toward said integral seat support and seating said retaining means in said retaining groove means.

20. A method of assembling a rotary ball valve having a valve body, a passageway defined by walls therethrough, an integral seat support in said valve body extending into said passageway and having an inclined seat supporting surface intersecting said walls, a first annular seat ring made of a material susceptible to cold-flow and having a frustoconical configuration with walls of uniform thickness, a ball valve member, said inclined seat support surface facing said ball valve member, a second annular seat ring made of a material susceptible to cold-flow and having a frustoconical configuration with walls of uniform thickness, a movable seat support having an inclined seat supporting surface facing said ball valve member and movably intersecting a wall of said passageway, and an assembly retaining means, the method comprising the steps of:

inserting, in order, into said passageway said first annular seat ring, said ball valve member, said second annular seat ring, said movable seat support and said retaining means, applying force to said ball member, seat rings, movable seat support and said retaining means to urge said seat rings, said ball valve member and said movable seat support toward said integral seat support in order to secure said retaining means in said passageway and thereby hold said seat rings, said ball valve member and said movable seat support in their respective positions, compressing said seat rings between said ball members and said inclined surfaces, respectively, and thereby deforming said seat rings to conform to the ball valve member, one side of said rings taking on a spherical concave configuration, and to the seat supports, another side of said rings compressed against said inclined seat supporting surfaces, so that said seat rings form respective seals between said ball valve member and said surfaces and so that said seat rings engage said passageway walls and form a seal between said ball valve member and said walls.

21. A method as in claim 20 wherein the cross-sectional width-to-thickness ratio of said seat rings is about 2 to 4, and including the step of compressing said seat rings to about 80% of their original thickness.

22. A method as in claim 21 wherein said flat annular seat rings comprise glass-reinforced tetraflouroethylene material and said method includes cold-flowing said material to form a seal against said passageway wall.

* * * * *